Figure 1:
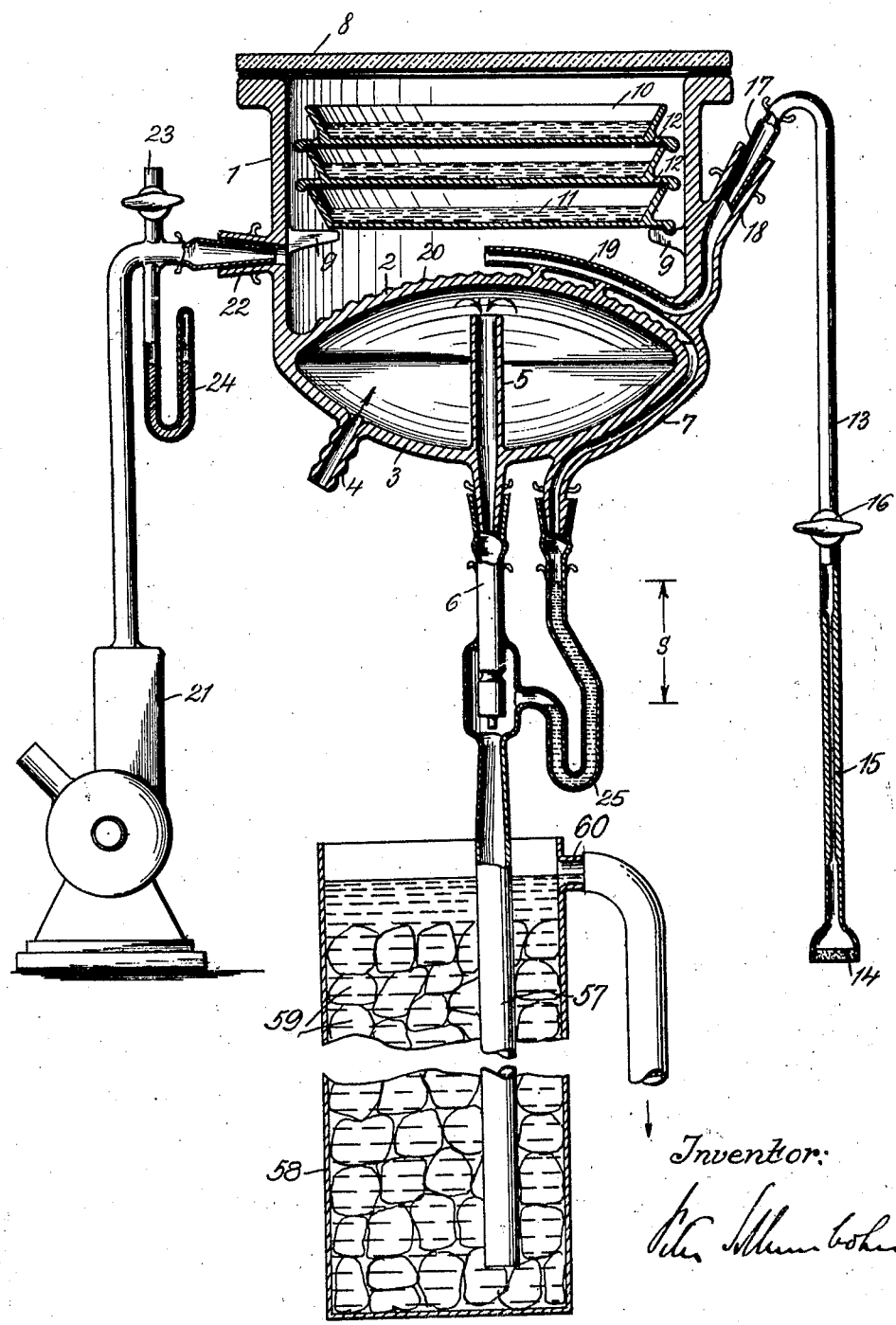

Jan. 17, 1933.   P. SCHLUMBOHM   1,894,893
APPARATUS FOR ABSORBING AQUEOUS VAPORS BY MEANS OF A HYGROSCOPIC
LIQUID SUCH AS SULPHURIC ACID IN A VACUUM
Filed Oct. 3, 1930   4 Sheets-Sheet 3

Inventor:

Patented Jan. 17, 1933

1,894,893

UNITED STATES PATENT OFFICE

PETER SCHLUMBOHM, OF BERLIN, GERMANY

APPARATUS FOR ABSORBING AQUEOUS VAPORS BY MEANS OF A HYGROSCOPIC LIQUID SUCH AS SULPHURIC ACID IN A VACUUM

Application filed October 3, 1930, Serial No. 486,218, and in Germany October 8, 1929.

My invention relates to the absorption of water by means of sulphuric acid and more particularly to an improved method of and apparatus for absorbing water in the form of aqueous vapor by means of sulphuric acid with the aid of a vacuum.

It is one of the objects of my invention to provide a method wherein, as distinguished from prior absorbing process, sulphuric acid is caused to continuously pass into an evacuated absorption chamber under the pressure of the atmosphere and to be removed therefrom by a suitable means a feature of the present invention residing accordingly in the provision of a pump, preferably a water-jet pump, for the removing purpose.

The constructional difficulties I had to overcome in carrying this method into effect reside in the fact that the most simple acid-proof pump, that is the said water-jet pump which alone could be used in many cases, cannot actually be utilized for drawing off the spent acid according to the old state of the art. A pump of this type is only adapted to produce a vacuum corresponding to the vapor pressure of the water of the supply systems, that is to say, a vacuum of about 12 mm. mercury. According to the present invention this steam-pressure range or domain of the said pump is confined or shut off with relation to the steam-pressure range or domain of the absorber by the acid removed from the latter. In this manner it will be possible to employ a pump of the said type and still decrease the vapor pressure in the absorber far below the vapor pressure of the pump.

Another object of my invention is to provide means for continuously and satisfactorily renewing the surface of the sulphuric acid in the absorber. Hitherto it was customary to renew the surface of the acid by shaking the entire absorption apparatus. According to the present invention, however, this troublesome operation is entirely dispensed with and means are provided for causing the sulphuric acid to purl over water-cooled surfaces so as to form thin layers which automatically ensure an excellent renewal of the surface.

Another object of my invention is to provide means for fully removing at once the absorption heat resulting from the intermixing of the sulphuric acid and the water. Moreover according to the present invention the sulphuric acid will be cooled in a best possible way by causing the same to flow in thin coherent layers over water-cooled surfaces, and the drop of the vapor pressure between the vapor generator and the absorber will always be a maximum, while the cooling water is economically utilized at the same time for driving the water-jet pump.

Another object of the present invention is to provide economical means for ventilating or airing purposes. In the methods as hitherto practised, plunger or piston pumps and rotary oil-pumps only have been used or suggested for the airing purpose, whereas according to the present invention mercurial vapor jet-pumps are employed and the particular advantages inherent in such pumps secured. Just pumps of this special type can be utilized in connection with my improved method in a highly economical manner inasmuch as I use the water-jet pump employed for removing the sulphuric acid, at the same time for producing a pre-vacuum for the mercury pump and I further utilize, if required or preferred, the operating water of the water-jet pump not only for cooling the absorber as herein described, but also for cooling the mercury pump.

With these objects in view I can realize and carry out the method according to the present invention with the aid of apparatus of comparatively small sizes and yet secure a very high efficiency in case of pumping aqueous vapors of a low tension. It is a known fact that the vaporization of water at low pressures can be utilized with an adequate heat supply, for drying purposes or for concentrating suitable solutions, and, without any heat supply, for refrigerating purposes, the production of ice or ice-cream and the like. Consequently the various apparatus adapted to be employed in connection with my improved method are not distinguished from each other by the part constituting the absorber, but only by the vapor generator inasmuch as the latter is provided with heating means or not. As the invention pertains specifically to the absorbing method and apparatus it is deemed unnecessary to describe in detail all of the other parts of the apparatus which are of usual construction and known to those skilled in the art to which this invention relates.

Figure 2:
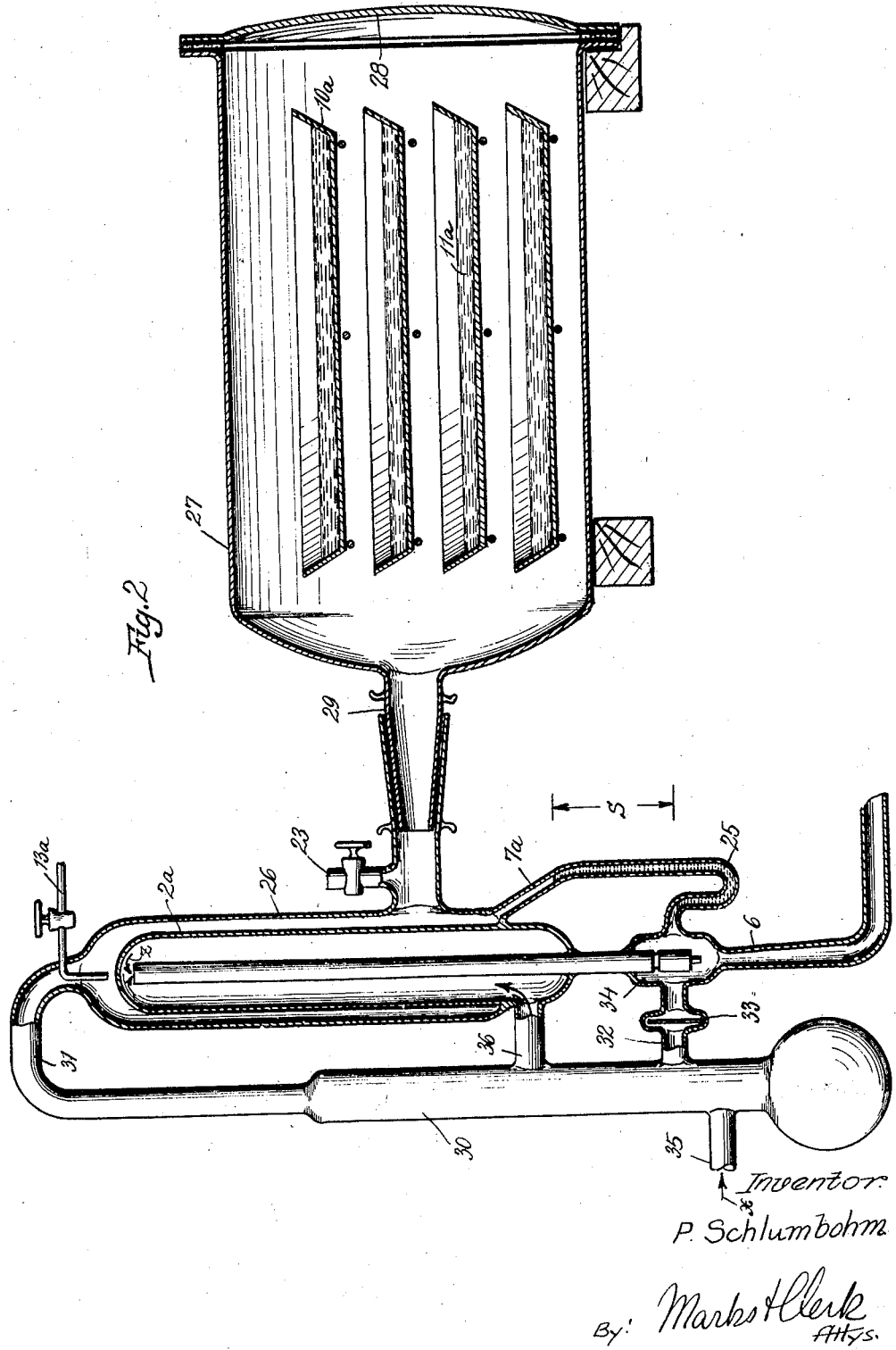
Figure 3:
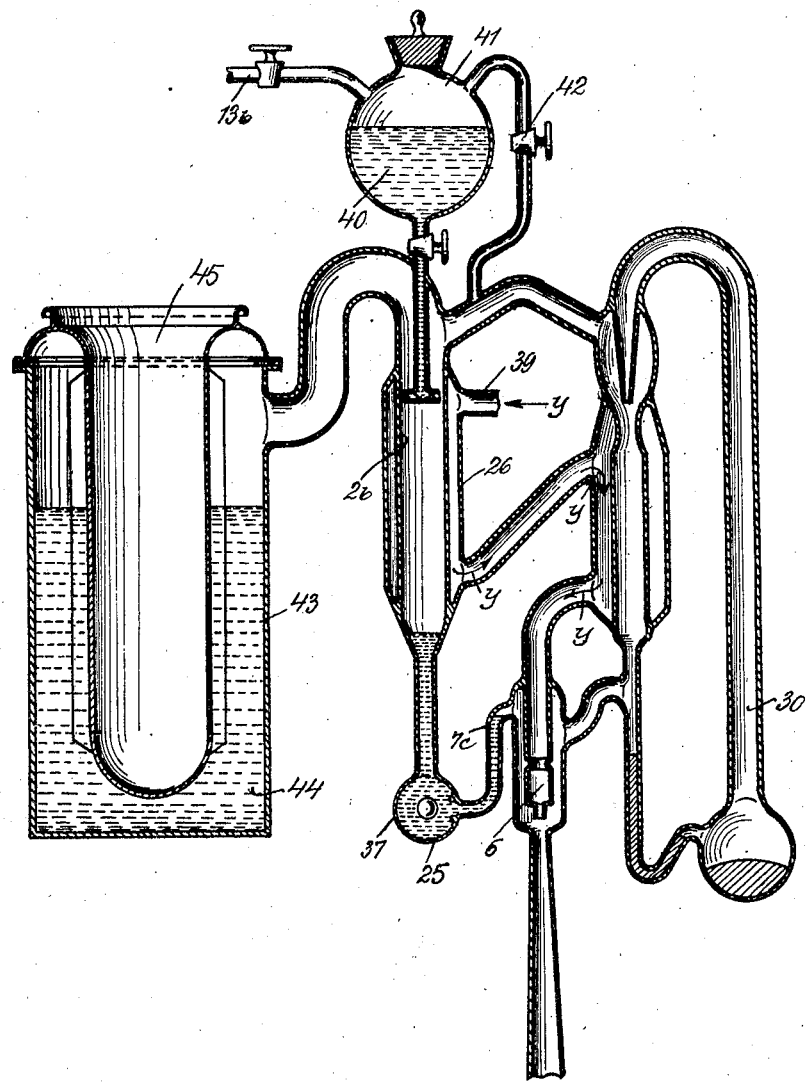
Figure 4:
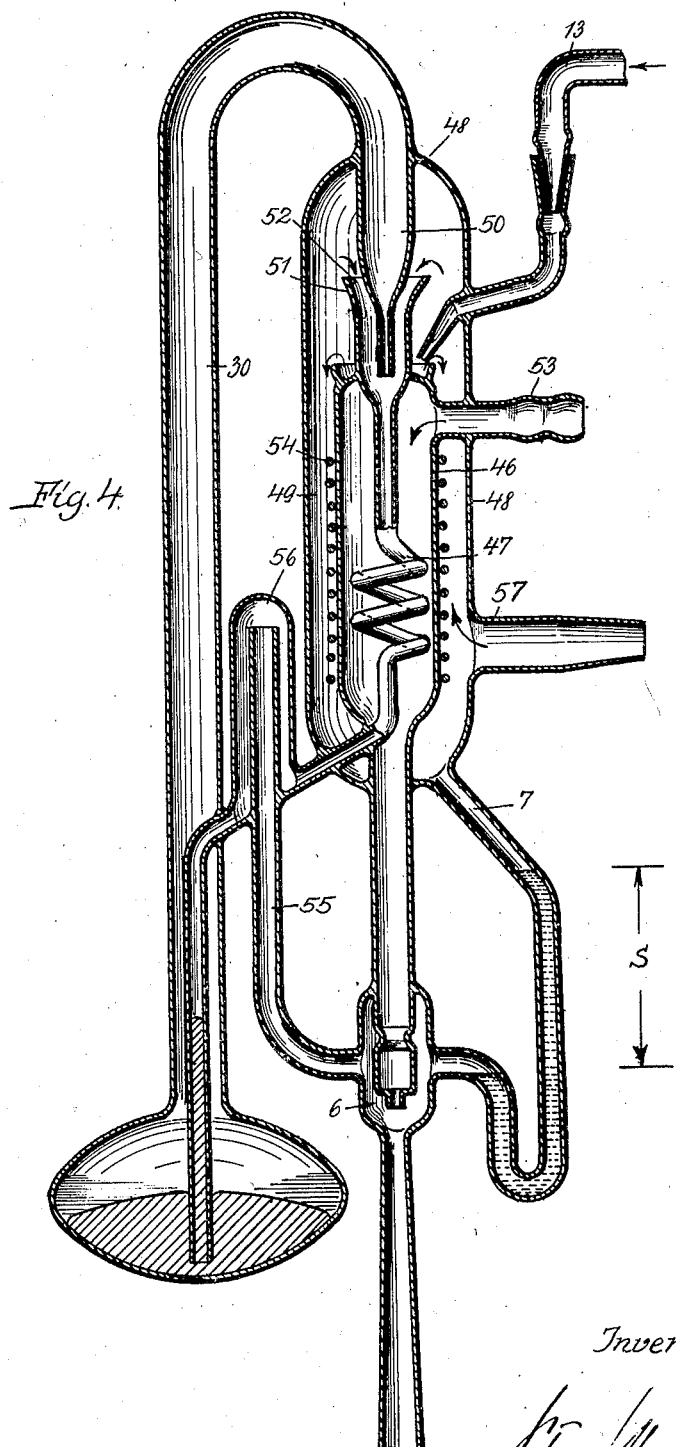

In the accompanying drawings forming a part of this specification a preferred form and manner of the apparatus for carrying out the improved method and embodying the invention is shown for purposes of exemplification. Fig. 1 is a view in vertical section of a vacuum absorbing apparatus. Fig. 2 is a view partly in elevation and partly in vertical section of another embodiment of the invention. In Fig. 3 a third modification is shown in vertical section wherein ice is produced indirectly by evaporation of water. Fig. 4 is a view in vertical section of a modified form of the injector, absorber unit.

Referring to the drawings Figure 1 is a view in vertical section of a vacuum absorbing apparatus adapted for use as a refrigerating machine or as a desiccator. The apparatus as shown comprises a cylindrical chamber or container 1 closed at the lower end by a double bottom 2, 3 integral with the chamber 1. The parts 1, 2 and 3 may be made of any appropriate material preferably porcelain. The lower concave bottom 3 is provided with an orifice shaped to form a nipple 4 for the attachment of a pressure-water supply tube, and with a vertical tube 5 located in the centre of the concave bottom 3 and extending upwards to near the upper convex bottom 2, so that the water supplied through the nipple 4, will flow off from the chamber formed by the two bottoms 2 and 3, when it rises beyond the level of the top of the tube 5. The lower end of the tube 5 projecting downwards from the bottom 3 is shaped and adapted to be connected with the water-jet pump 6 whereof the suction conduit 7 terminates in the interior of the vacuum chamber 1 at the lowermost point thereof.

The top end of the vacuum chamber 1 is flanged and adapted to be closed air-tight by means of a glass-plate 8 and an annular washer of suitable resilient material. Projecting inward from the side wall of the chamber 1 are supporting brackets 9 carrying a plurality of superposed shallow pans or basins 10 filled with water for the production of ice in case of using the apparatus for refrigerating purposes. The bottoms of the upper pans or basins are shaped to form annular flanges with perforations 12, so that aqueous vapors forming in the pans will be allowed to escape therethrough from the lower pans, while the uppermost pan is open for the same purpose.

The sulphuric acid required for the absorption purpose is supplied by a container or flask which may be of a type or form as usually employed for storage purposes, and is kept at normal atmospheric pressure. The said acid flash (not shown) is connected with the vacuum chamber by means of a suction tube 13 preferably made of glass and provided with a glass filter 14. About midway between the filter 14 and the absorbing chamber 1 a valve 16 is provided in the glass tube 13 and the part of the latter between the valve 16 and the filter 14 has a reduced inner diameter, as indicated by the reference character 15, for the purpose of regulating the flowing velocity. The upper end of the glass tube 13 is bent and shaped to form a slightly conical plug 17 fitting snugly in a correspondingly conical, lateral orifice 18 of the absorbing or vacuum chamber 1, communicating with a tubular passage 19 partly in the side wall of the latter and partly projecting inward from the same.

The free inner end of the passage 19 opens into the absorbing or vacuum chamber 1 a little above the centre of the upper or inner bottom 2 thereof, so that the sulphuric acid flowing through the glass tube 13 into the passage 19 will be discharged from the latter onto the topmost point of the water-cooled convex surface of the upper bottom 2, and will purl down to the lowermost point of the chamber. As the acid slowly flows over the convex surface, the same will be diluted by the reception of aqueous vapors, due to its hygroscopic property and the thus diluted acid will escape into the suction conduit 7 of the water-jet pump 6. Preferably I provide a spiral or helical groove, in the top surface of the upper bottom 2 for ensuring a prolonged uniform path for the acid to purl from the top to the bottom of the surface and into the conduit 7.

The small amount of air continuously introduced into the absorbing chamber 1 by the sulphuric acid which, as above intimated, is kept under atmospheric-pressure, is removed from the chamber 1 by the permanently working air pump 21. The suction tube of the pump 21 is attached to the chamber 1 by means of a conical plug connection 22 similar to the described connection 17, 18. In the upper end of the suction tube there is also provided a gauge 24 and a branch tube with a valve 23 for the admission of air required for working the apparatus. The herein mentioned cutting off or seclusion of the aqueous vapor pressure domain or system of the water-jet pump from the aqueous vapor pressure domain or system of the absorber is accomplished in the embodiment shown, in a most simple and efficient manner by the provision of an elbow 25 in the suction tube 7. In this way the sulphuric acid removed from the absorbing chamber 1 into the tube 7, will form a trap or cutting-off column $s$ corresponding to the difference in pressure between the said two vapor pressure systems.

In some cases it will be advisable to deacidify the waste-water of the water pump by means of any suitable neutralizing agents. In a simple and efficient way this may be accomplished by causing the spent water to flow through a container or chamber filled with crushed marble. This embodiment is shown by way of exemplification in Figure 1 in which 57 is the outlet pipe for the acidulated water, said pipe ending in the container 58 filled with crushed marble 59. The neutralized water leaves the container 58 through the overflow pipe 60 provided near the top of the said container.

In the embodiment shown in Figure 2 partly in elevation and partly in vertical section, the surface for distributing the sulphuric acid and causing the same to form a thin layer comprises a tube 2ª through which the water flows to the water-jet pump 6. The sulphuric acid is supplied by a tube 13ª provided with a suitable valve, in the usual manner and caused to flow slowly over the outer surface of the tube 2ª closed at the top, a branch tube 7ª being provided for the discharge of the acid into water-jet pump 6. The tube 7ª is bent to form an elbow 25 similarly as described with reference to Figure 1 and for the like purpose of forming a trap. The annular space between the tube 2ª and the outer tube 26 constitutes the absorbing chamber or absorber. It will be seen, that in the modification illustrated in Figure 2 the absorber is locally separated from the evaporating chamber or evaporator in contradistinction to the embodiment shown in Figure 1. In Figure 2 the evaporator is of the desiccator type or a so-called vacuum drying stand comprising a vacuum chest 27 provided with an air-tight closing door 28, a conical discharge plug or tube 29 and means for supporting the pans or basins 10ª.

The modification shown in Figure 2 is of particular advantage for the reason that the assembled parts such as the absorber 26, the water-jet pump 6 and the mercury pump 30, are combined to form a unitary apparatus, the suction tube 31 of the mercury jet pump being immediately connected and integral with the tube 26 forming the absorber. The conduit 32 of the mercury pump is connected for communication with the suction chamber 34 of the water-jet pump and a non-return valve 33 is provided in the conduit. The working water required for the operation of the water pump and acting to cool the tube 2ª, also serves for cooling the mercury pump. To this end the cooling water conduits or tubes are assembled and arranged in a manner that the pressure water is supplied to the cooling water admission tube 35 of the mercury pump and the cooling water outlet tube 36 of the pump is connected with or serves as the water inlet tube of the absorber, as indicated by the arrows $x$ in Figure 2. The unit comprising the mercury pump, the absorber and the water pump are preferably made of one and the same material such as quartz or acid-proof steel.

In the embodiment shown in Figure 3 a mercury pump 30, an absorber 26 and a water-jet pump 6 are combined to form a unit similar to the combination illustrated in Figure 2. In the suction tube 7ᶜ connecting the water pump with the absorber likewise an elbow 25 is provided to form a trap for the acid and an enlarged part 37 thereof is equipped with an aerometer for controlling the concentration of the discharged spent acid. The cooling water serving at the same time as a working fluid in the water pump is admitted in the cooling chamber of the absorber at 39 and is caused to flow through the cooling jacket of the mercury pump to the water pump as indicated by the arrows $y$. The sulphuric acid 40 drawn in by way of suction through the conduit 13ᵇ may be allowed, if required or desired to be relieved of air, while kept in the intermediate chamber 41, by opening the relief cock 42, prior to allowing the acid to flow into the absorber 26 and over the water-cooler tubular surface 2ᵇ thereof.

The evaporator 43 is filled with a sufficient quantity of water, preferably a brine 44 for the evaporating purpose. The cover 45 of the evaporator is enlarged and shaped to form a depending container adapted to receiver and hold the water to be refrigerated for the production of ice, and to dive in the brine 44, as shown in Figure 3. The apparatus shown in Figure 3 is constructed and adapted to produce ice by indirect evaporation of water, whereas the embodiments shown in Figures 1 and 2 are constructed and intended for the production of ice by way of direct evaporation of water. The ice is kept at atmospheric pressure.

I have herein described and shown several practical constructions of my present improvements, but it will be apparent that the apparatus is susceptible of embodiment in various other alternative forms, and I, therefore reserve the privilege of resorting to all such legitimate changes as may be fairly embodied within the spirit and scope of the invention as claimed in the appended claims.

Figure 4 shows a very simple combination of a mercury-pump, an absorber and a water-injector to form a unit. The cooling jacket 46 of the condenser 47 of the mercury-pump 30 forms itself the water-cooled surface for the purling sulphuric acid. The water-jacket 46 is surrounded by a second tube 48 and the room between the tubes 46 and 48 serves as absorber. The injector 50 for the mercury-vapor is guided through the wall of the tube 48 and the diffuser 51 is guided through the wall of the tube 46 and based on it. The suction opening 52 allows to pump away those vapors which are not absorbed by the sulphuric acid and in first line the air, brought into the absorber by the entering sulphuric acid. The water for the injector 6 is entering through the tube 53 into the tube 46 and cools here the condenser of the mercury and at the same time the absorbing sulphuric acid. The injector 6 is connected with the tube 46.

The sulphuric acid is sucked into the absorber through the tube 13 and runs over the surface of the tube 46 and its rings 54. After having absorbed the water-vapors, coming through the tube 57, the acid flows through the tube 7 into the water-pump in the way described before.

The conduit 55 for the pre-vacuum ends in a dome 56 to prevent mercury from running into the tube 55. The conduit 57 is the connection between the absorber and the evaporator.

What I claim is:

1. A device for absorbing aqueous vapors by means of a hygroscopic liquid such as sulphuric acid in a vacuum which comprises an absorber and a water-jet vacuum pump adapted to eliminate the spent acid from the absorber, and a trap of spent acid for shutting off the domain of the water-vapor pressure of the pump with relation to the domains of the water-vapor pressure in the absorber.

2. In the device as described in claim 1, means for causing the sulphuric acid to slowly flow in the form of continuous thin films over a water-cooled surface.

3. In the device as described in claim 1, means for cooling the surfaces over which the spent acid flows towards the water jet-vacuum-pump, by the use of the working water of the pump.

4. In the device as described in claim 1, a mercury jet pump for evacuating the absorber.

5. In the device as described in claim 1, a mercury jet pump, the said vacuum pump acting to remove the spent acid from the absorber to produce a partial vacuum in the mercury jet pump.

6. In the device as described in claim 1, a container, means adapted to cause the spent acidulated water of the water jet vacuum pump to pass through said container which is filled with crushed marble, thereby neutralizing the acidulated water.

7. An apparatus for absorbing aqueous vapors comprising two tubular members inserted one within the other, means connecting the space between said members with an evacuated container, and a water-jet pump which communicates with the space between the said tubular members and adapted to withdraw the spent acid which has flowed over the outer surface of the inner tubular member, said pump being actuated by cooling water issuing from within the inner tubular member.

8. An apparatus as claimed in claim 7 in which a U-shaped tube provides communication between said water-jet pump and the space between the tubular members, said U-shaped tube forming an acid trap.

9. An apparatus as claimed in claim 7 in which a mercury vapor jet pump provides communication with the space between the tubular members.

10. An apparatus as claimed in claim 7 in which said means connects the evacuated container with the lower part of the space between the tubular members.

11. An apparatus as claimed in claim 7 in which the vapor jet-pump communicates with the top of the space between the tubular members.

In testimony whereof I affix my signature.

PETER SCHLUMBOHM.